United States Patent
Izumiyama et al.

(10) Patent No.: US 9,989,012 B2
(45) Date of Patent: Jun. 5, 2018

(54) VAPOR JETTING DEVICE AND SPACECRAFT

(71) Applicants: IHI Corporation, Tokyo (JP); IHI AEROSPACE CO., LTD., Tokyo (JP)

(72) Inventors: Taku Izumiyama, Tokyo (JP); Hatsuo Mori, Tokyo (JP); Kozue Hashimoto, Tokyo (JP); Toru Nagao, Tokyo (JP)

(73) Assignee: IHI CORPORATION, Tokyo (JP)

( * ) Notice: Subject to any disclaimer, the term of this patent is extended or adjusted under 35 U.S.C. 154(b) by 588 days.

(21) Appl. No.: 14/617,341

(22) Filed: Feb. 9, 2015

(65) Prior Publication Data

US 2015/0152812 A1 Jun. 4, 2015

Related U.S. Application Data

(63) Continuation of application No. PCT/JP2013/071500, filed on Aug. 8, 2013.

(30) Foreign Application Priority Data

Aug. 10, 2012 (JP) .................................. 2012-177919

(51) Int. Cl.
*F02K 7/02* (2006.01)
*B64G 1/40* (2006.01)
(Continued)

(52) U.S. Cl.
CPC .................. *F02K 7/02* (2013.01); *B64G 1/26* (2013.01); *B64G 1/40* (2013.01); *F02K 9/44* (2013.01); *F02K 9/94* (2013.01); *F05D 2210/12* (2013.01)

(58) Field of Classification Search
CPC ... F02K 9/42; F02K 9/44; F02K 9/605; F02K 9/68; F02K 9/50; F02K 9/94; F02K 7/02;
(Continued)

(56) References Cited

U.S. PATENT DOCUMENTS 3,092,968 A 6/1963 Scurlock et al.
3,222,498 A 12/1965 Miksch
(Continued)

FOREIGN PATENT DOCUMENTS

EP 2366626 A1 9/2011
JP 9-242611 A 9/1997
(Continued)

OTHER PUBLICATIONS

Cardin, "A Cold Gas Micro-Propulsion System for CubeSats", 2003.*

(Continued)

*Primary Examiner* — William H Rodriguez
*Assistant Examiner* — William Breazeal
(74) *Attorney, Agent, or Firm* — Volpe and Koenig, P.C.

(57) ABSTRACT

Provided is a vapor jetting device including: a box-shaped casing; a propellant holding unit that is placed in the casing and forms a space for holding a propellant; a gas storing unit that is placed in the casing, forms a space that is divided from the propellant holding unit by a partition wall including a communication hole, and stores gas; a machine housing unit that is placed in the casing, forms a space that is divided from the propellant holding unit and the gas storing unit by partition walls, and houses machines; a nozzle that is connected to the casing and ejects the gas to an outside; a gas flow path that is formed in the casing and supplies the gas stored in the gas storing unit to the nozzle; and a heater that is placed in the casing and heats at least the gas storing unit.

8 Claims, 10 Drawing Sheets

(51) Int. Cl.
*F02K 9/44* (2006.01)
*F02K 9/94* (2006.01)
*B64G 1/26* (2006.01)

(58) Field of Classification Search
CPC .. B64G 1/26; B64G 1/406; B64G 1/40; F03H 1/0093; F05D 2210/12
See application file for complete search history.

(56) References Cited

U.S. PATENT DOCUMENTS

| | | | |
|---|---|---|---|
| 4,027,494 A | 6/1977 | Fletcher et al. | |
| 6,193,193 B1 | 2/2001 | Soranno et al. | |
| 6,322,023 B1 | 11/2001 | Soranno et al. | |
| 6,334,301 B1* | 1/2002 | Otsap | F15C 5/00 137/833 |
| 2008/0134663 A1* | 6/2008 | Totani | B64G 1/406 60/203.1 |
| 2011/0214410 A1 | 9/2011 | Yamamoto et al. | |
| 2011/0240801 A1 | 10/2011 | Manzoni | |

FOREIGN PATENT DOCUMENTS

| | | |
|---|---|---|
| JP | 2004-197592 A | 7/2004 |
| JP | 2009-214695 A | 9/2009 |
| JP | 2011-183840 A | 9/2011 |
| JP | 2011-183841 A | 9/2011 |

OTHER PUBLICATIONS

Japanese Office Action with English translation, Japanese Patent Application No. 2014-529552, Jul. 29, 2015, 6 pgs.
Extended European Search Report, European Patent Application No. 13828089.6, Feb. 18, 2016, 8 pgs.
International Search Report, PCT/JP2013/071500, dated Nov. 12, 2013, 2 pgs.

* cited by examiner

VAPOR JETTING DEVICE AND SPACECRAFT

TECHNICAL FIELD

The present invention relates to a vapor jetting device and a spacecraft, and, more particularly, to a vapor jetting device that generates thrust in outer space and a spacecraft including the vapor jetting device.

BACKGROUND ART

In recent years, a propulsion system including a gas-liquid equilibrium thruster has been developed as a propulsion system for a small satellite. The gas-liquid equilibrium thruster is a vapor jetting device that jets gas by means of the steam pressure of a propellant, and holds the propellant in the form of liquid in a tank. At the time of posture control, orbit change, and the like, the gas-liquid equilibrium thruster evaporates the propellant, jets only gas from a nozzle, and thus can obtain thrust. The propulsion system including the gas-liquid equilibrium thruster thus configured does not require an air reservoir and a combustor, and hence reduction in weight and size of the system is possible. Meanwhile, improvement of the propulsion system has been desired in terms of how to store the propellant in the form of liquid and how to gasify the propellant in the form of liquid in order to obtain stable thrust (see, for example, Patent Document 1 and Patent Document 2).

For example, in a vapor jetting device described in Patent Document 1, a foamed metal member is provided inside of a tank, and a propellant in the form of liquid is held in air bubbles of the foamed metal member. Then, the vapor jetting device heats the tank to thereby gasify the propellant with the intermediation of the foamed metal member.

Moreover, in a vapor jetting device described in Patent Document 2, a plurality of holding plates are radially placed inside of a tank, and a propellant in the form of liquid is attached to and held by the holding plates by means of surface tension. Then, the vapor jetting device heats the tank to thereby gasify the propellant, and reserves the vaporized gas in a gas reserving space formed in an upper part of the tank.

PRIOR ART DOCUMENT

Patent Document

Patent Document 1: Japanese Patent Laid-Open No. 2009-214695

Patent Document 2; Japanese Patent Laid-open No. 2011-183840

SUMMARY OF THE INVENTION

Problems to be Solved by the Invention

Unfortunately, the vapor jetting device described in Patent Document 1 has the following problems. That is, the entire space in the tank needs to be filled with the foamed metal member, and hence reduction in weight of the tank is difficult. Further, when the propellant is gasified, the entire tank needs to be heated, and this requires enormous thermal energy.

Moreover, the vapor jetting device described in Patent Document 2 has the following problem. That is, because the storage space of the propellant and the gas reserving space are placed close to each other, the propellant in the form of liquid moves into the gas reserving space depending on posture control of a spacecraft, and a sloshing phenomenon may occur.

Moreover, the vapor jetting device described in each of Patent Document 1 and Patent Document 2 has the following problems. That is, because the tank has a spherical shape, a wasted space occurs when the vapor jetting device is connected to a spacecraft such as a small satellite, and the size of the spacecraft increases. Further, because the tank and the thruster are connected to each other by piping, although a flexible design is possible, connection work of the piping requires time and labor, and leakage inspection of a large number of piping joints requires time, labor, and specialized knowledge.

The present invention has been made in view of the above-mentioned problems, and an object of the present invention is to provide a vapor jetting device and a spacecraft that can improve gas-liquid separation performance and can achieve redaction in size and simplification of the apparatus.

Means for Solving the Problems

The present invention provides a vapor jetting device that evaporates a propellant in the form of liquid and jets gas by means of a steam pressure to thereby obtain thrust, including: a box-shaped casing; a propellant holding unit that is placed in the casing and forms a space for holding the propellant; a gas storing unit that is placed in the casing, forms a space that is divided from the propellant holding unit by a partition wall including a communication hole, and stores the gas; a machine housing unit that is placed in the casing, forms a space that is divided from the propellant holding unit and the gas storing unit by partition walls, and houses machines; a nozzle that is connected to the casing and ejects the gas to an outside; a gas flow path that is formed in the casing and supplies the gas stored in the gas storing unit to the nozzle; and a heater that is placed in the casing and heats at least the gas storing unit.

The gas storing unit may include: a gas outlet for discharging the gas; and a heat spreader placed between the gas outlet and the communication hole. Moreover, a gas supply tube that connects the gas outlet and the gas flow path to each other may be arranged in the machine housing unit, and a valve that controls ejection of the gas may be provided to the gas supply tube. Further, the heater may be placed at a position adjacent to the heat spreader.

The propellant holding unit may include: a fill and drain port for pouring or discharging the propellant, the fill and drain port being placed at a position at which the fill and drain port confronts the gas storing unit; and a plurality of propellant holding plates that generate surface tension on the propellant to thereby hold the propellant. Moreover, a filter that suppresses the propellant in the form of liquid from entering the gas storing unit may be placed in the communication hole. Moreover, the heater may be controlled such that a temperature of the gas storing unit becomes higher than a temperature of the propellant holding unit.

The casing may be stackable on an additional module having the same shape. Moreover, the additional module may be an additional tank that stores the propellant, may be a battery module on which a battery is mounted, may be a monitoring module on which a monitoring machine or a measuring machine is mounted, and may be a control module that controls machines mounted on the vapor jetting device or the additional module.

The present invention further provides a spacecraft including the above-mentioned vapor jetting device.

Advantageous Effects of the Invention

According to the vapor jetting device and the spacecraft of the present invention, because the propellant holding unit, the gas storing unit, and the machine housing unit of the vapor letting device are placed in one casing, reduction in size of the apparatus can be achieved. Moreover, because the gas flow path that supplies the gas to the nozzle is formed in the casing, a large number of pipes can be omitted, simplification of the apparatus can be achieved, and labor in piping connection work and leakage inspection work can be reduced. Moreover, because the propellant holding unit and the gas storing unit are divided from each other by the partition wall including the communication hole, the propellant in the form of liquid can be suppressed from entering the gas storing unit, and gas-liquid separation performance can be improved.

Moreover, because the heat spreader is placed in the gas storing unit, even in the case where the propellant in the form of liquid enters the gas storing unit, the propellant can be evaporated and gasified before entering the gas outlet, and the gas-liquid separation performance can be further improved.

Moreover, because the propellant holding unit, the gas storing unit, and the machine housing unit are placed in one casing, the casing is stackable on the additional module having the same shape. Accordingly, the additional tank, the battery, the monitoring machine such as a camera, the measuring machine such as a laser radar and a gyroscope, and various control machines can be easily added, and convenience can be improved.

MODE FOR CARRYING OUT THE INVENTION

Figure 1A:
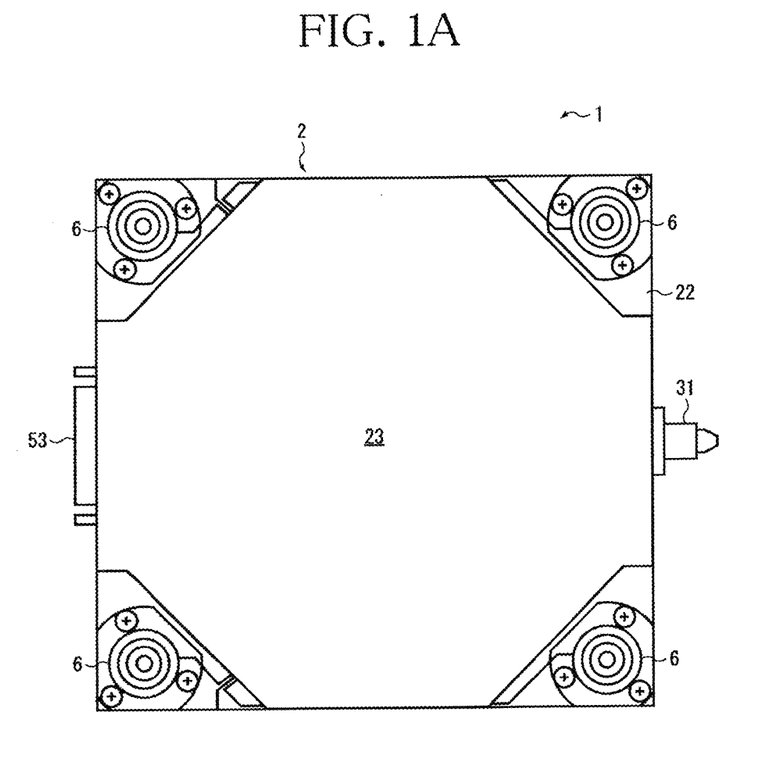
FIG. 1A is a plan view illustrating a vapor jetting device according to a first embodiment of the present invention.
Figure 1B:
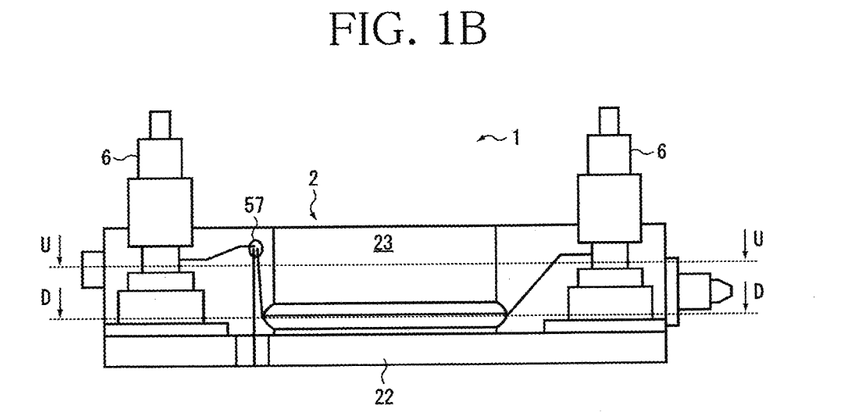
FIG. 1B is a side view illustrating the vapor jetting device according to the first embodiment of the present invention.
Figure 2A:
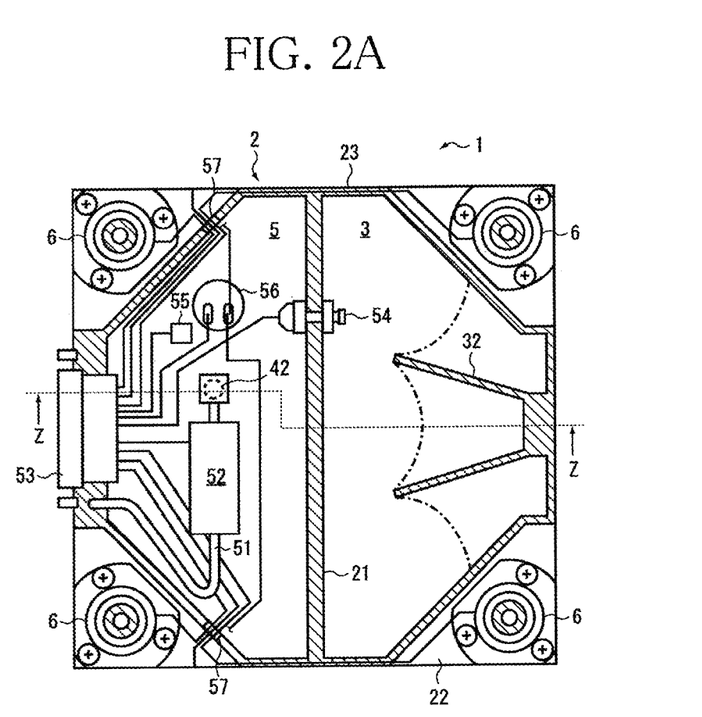
FIG. 2A is a horizontal sectional view taken along a line U-U in FIG. 1B.
Figure 2B:
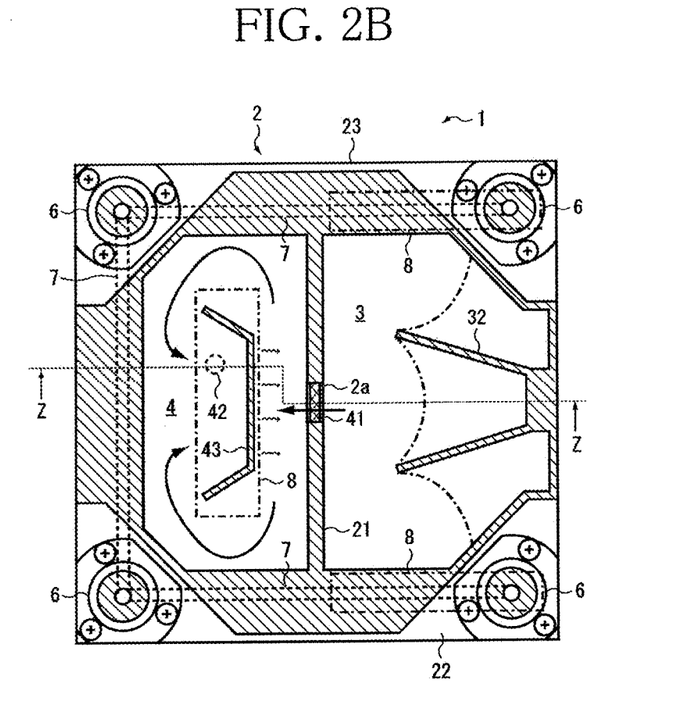
FIG. 2B is a horizontal sectional view taken along a line D-D in FIG. 1B.
Figure 3A:
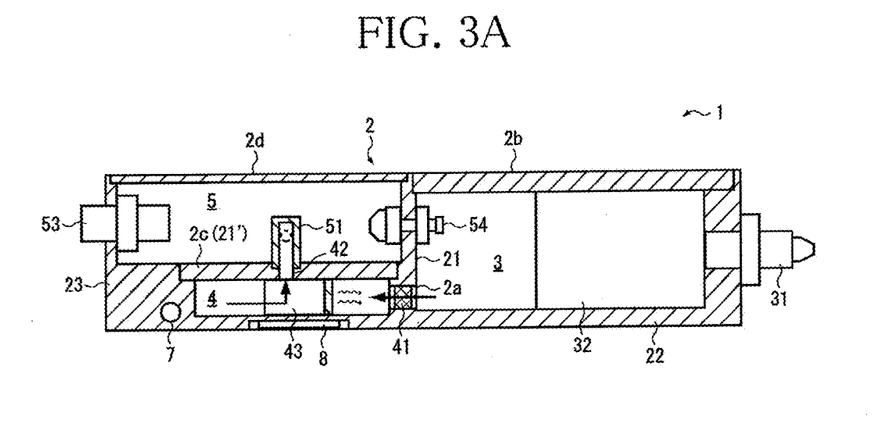
FIG. 3A is a sectional view taken along a line Z-Z in FIG. 2A and FIG. 2B.
Figure 3B:
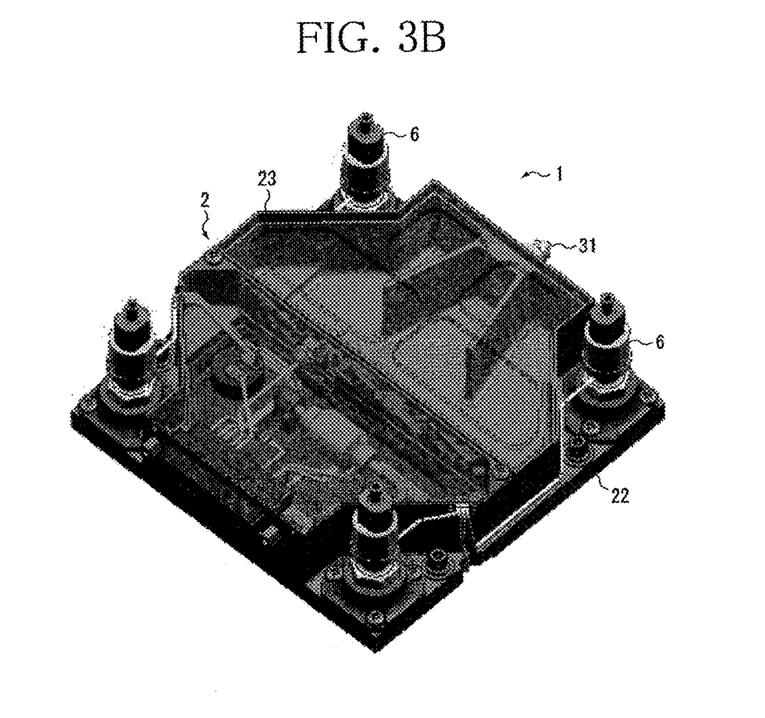
FIG. 3B is a perspective view of the vapor jetting device.

Hereinafter, embodiments of the present invention are described with reference to FIG. 1A to FIG. 7B. Here, FIG. 1A is a plan view illustrating a vapor jetting device according to a first embodiment of the present invention, and FIG. 1B is a side view thereof. FIG. 2A is a horizontal sectional view taken along a line U-U in FIG. 1B, and FIG. 2B is a horizontal sectional view taken along a line D-D in FIG. 1B. FIG. 3A is a sectional view taken along a line Z-Z in FIG. 2A and FIG. 2B, and FIG. 3B is a perspective view of the vapor jetting device.

As illustrated in FIG. 1A to FIG. 3B, a vapor jetting device 1 according to the first embodiment of the present invention is a vapor jetting device that evaporates a propellant in the form of liquid and jets gas by means of a steam pressure to thereby obtain thrust. The vapor jetting device 1 includes: a box-shaped casing 2; a propellant holding unit 3 that is placed in the casing 2 and forms a space for holding the propellant; a gas storing unit 4 that is placed in the casing 2, forms a space that is divided from the propellant holding unit 3 by a partition wall 21 including a communication bole 2a, and stores the gas; a machine housing unit 5 that is placed in the casing 2, forms a space that is divided from the propellant holding unit 3 and the gas storing unit 4 by partition walls 21, 21', and houses machines; nozzles 6 that are connected to the casing 2 and eject the gas to the outside; a gas flow path 7 that is formed in the casing 2 and supplies the gas stored in the gas storing unit 4 to the nozzles 6; and a heater 8 that is placed in the casing 2 and heats at least the gas storing unit 4.

The casing 2 includes, for example, a quadrangular bottom part 22 and a substantially octagonal main body part 23 placed above the bottom part 22. The casing 2 is formed using as aluminum alloy or the like that is a material having a high specific strength, but the present invention is not limited thereto. The main body part 23 of the casing 2 is hollow, and the propellant holding unit 3, the gas storing unit 4, and the machine housing unit 5 are placed therein as described above. Because components that have been individually placed in conventional cases are housed in one casing 2, the vapor jetting device 1 can be unitized, and labor-saving in complicated piping connection work and leakage inspection work is possible. Note that the structure of the casing 2 can be manufactured by machining such as shaving, molding, or a combination thereof.

The propellant holding unit 3 is, for example, a tank that occupies about one half of the space of the main body part 23, and holds the propellant in the form of liquid. The used propellant is, for example, liquefied alternatives for chlorofluorocarbon, but is not limited thereto, and may be substances that vaporize around room temperature, such as alcohol (methanol, ethanol), alkane (propane, butane, isobutane), and inorganic substances (water). Moreover, the used, propellant may be flame-resistant substances having high specific impulse (ISP).

Moreover, as illustrated in FIG. 3A, the propellant holding unit 3 has a shape obtained by making part of the main body part 23 deeper to near the bottom part 22, and a cover member 2b is placed in an upper part thereof, whereby a hermetically sealed space is formed. The cover member 2b may be fixed to the main body part 23 by a fastening tool such as a bolt, and may be fixed to the main body part 23 by connection means such as welding and an adhesive. Alternatively, a seal material may be placed between the cover member 2b and the main body part 23.

Moreover, as illustrated in FIG. 2A, FIG. 2B, and FIG. 3A, the propellant holding unit 3 includes: a fill and drain port 31 for pouring or discharging the propellant, the fill and drain port 31 being placed at a position at which the fill and drain port 31 confronts the gas storing unit 4; and a plurality of propellant holding plates 32 that are radially placed about the fill and drain port 31. The fill and drain port 31 is opened only when the propellant is poured and when the remaining propellant is discharged. The fill and drain port 31 is kept hermetically sealed in other cases.

The propellant holding plates 32 are plate members that generate surface tension on the propellant, and are placed at predetermined intervals in the propellant holding unit 3. Here, the case where the propellant holding plates 32 are radially placed is illustrated, but the present invention is not limited to such placement. In general, liquid tends to gather in a narrow portion in a zero-gravity space. With the use of such a nature, as indicated by an alternate long and short dash line in each of FIG. 2A and FIG. 2B, the propellant can be held by the propellant holding plates 32 by means of the surface tension, and the propellant in the form of liquid can be retained in the propellant holding unit 3. Note that, although the radiation origin of the propellant holding plates 32 is set to the fill and drain port 31 here, the radiation origin of the propellant holding plates 32 may be set to a position different from the position of the fill and drain port 31, and the fill and drain port 31 may be formed in the bottom part 22.

The gas storing unit 4 is, for example, a tank that occupies about one quarter of the space of the main body part 23, and stores the vaporized gas of the propellant. As illustrated in FIG. 3A, the gas storing unit 4 is formed by a lower structure part of a shape obtained by making part of the main body part 23 deeper to near the bottom part 22, and a cover member 2c placed in a middle part configures the partition wall 21' that forms a space divided from the machine housing unit 5. The cover member 2c may be fixed to the main body part 23 by a fastening tool such as a bolt, and may be fixed to the main body part 23 by connection means such as welding and an adhesive. A seal material may be placed between the cover member 2c and the main body part 23. Moreover, the gas storing unit 4 is divided from the adjacent propellant holding unit 3 by the partition wall 21 formed therebetween.

Note that, in FIG. 3A, because the gas flow path 7 is formed in a portion of the main body part 23 around the gas storing unit 4, the gas storing unit 4 is defined in a space smaller than that of the machine housing unit 5, but, in the case where a space large enough to form the gas flow path 7 exists in another portion of the main body part 23, the gas storing unit 4 may have a space equivalent to that of the machine housing unit 5, and may have a space larger than that of the machine housing unit 5.

Moreover, as illustrated in FIG. 2B and FIG. 3A, the gas storing unit 4 is communicated with the propellant holding unit 3 through the communication hole 2a formed in the partition wall 21, and the gas vaporized in the propellant holding unit 3 is pushed out of the propellant holding unit 3 by the steam pressure, and enters the gas storing unit 4 from the communication hole 2a. A net-like filter 41 that suppresses the propellant in the form of liquid from entering the gas storing unit 4 is inserted in the communication hole 2a. Because the filter 41 is placed in this manner, even if the propellant in the form of liquid tries to move from the propellant holding unit 3 to the gas storing unit 4, the entrance of the propellant can be suppressed by surface tension. Moreover, the filter 41 also has a function of collecting dirt and dust mixed in the propellant holding unit 3, and thus can suppress the nozzles 6 from clogging.

Moreover, the gas storing unit 4 includes: a gas outlet 42 for discharging the gas; and a heat spreader 43 placed between the gas outlet 42 and the communication hole 2a. The gas outlet 42 is formed in, for example, the cover member 2c (partition wall 21'), and the gas stored in the gas storing unit 4 is supplied from the gas outlet 42 to the gas flow path 7 through a gas supply tube 51 placed in the machine housing unit 5 as described later. Note that the gas outlet 42 does not necessarily need to be formed in the cover member 2c (partition wall 21'), and may be formed in a peripheral wall part of the main body part 23, and may be formed so as to enable the gas to be directly supplied to the gas flow path 7 without passing through the gas supply tube 51.

The heat spreader 43 is a plate-like member placed in the gas storing unit 4, and is heated by the heater 8 placed at a position adjacent to the heat spreader 43. As illustrated in FIG. 3A, the heater 8 is placed on the outer side of the bottom part 22 at a position corresponding to immediately beneath the heat spreader 43, and thermal energy of the heater 8 is transmitted to the heat spreader 43 through the bottom part 22. The heat spreader 43 is heated by the heater 8 up to a temperature higher than the boiling point of the propellant.

As illustrated in FIG. 2B, the heat spreader 43 is formed in such a substantially U-shape that surrounds the gas outlet 42, and the gas that has entered the gas storing unit 4 from the communication hole 2a cannot reach the gas outlet 42 without going around the heat spreader 43. Accordingly, for example, even in the case where the propellant enters the gas storing unit 4 from the communication hole 2a while keeping the form of liquid, the propellant comes into contact with the heat spreader 43. Because the heat spreader 43 is sufficiently heated, the propellant that has come into contact with the heat spreader 43 easily evaporates and gasifies. That is, during the operation of the heat spreader 43, the inside of the gas storing unit 4 is practically always filled with the vaporized gas of the propellant. Because the heat spreader 43 is placed in the gas storing unit 4 in this manner, even in the case Where the propellant in the form of liquid enters the gas storing unit 4, the propellant can be evaporated and gasified before entering the gas outlet 42, so that gas-liquid separation performance can be improved. Note that, although the case where the heat spreader 43 is formed in the substantially U-shape is illustrated here, the heat spreader 43 is not limited to this shape, and may have a circular arc shape and a V-shape.

Alternatively, the heat spreader 43 may be formed in a plate-like shape using a wire net. In this case, it is preferable that the mesh size of the wire net be large enough to capture liquid by means of surface tension. Moreover, a plurality of the heat spreaders 43 formed using the wire net may be placed in parallel, to thereby suppress liquid from passing therethrough.

The machine housing unit 5 is, for example, a container that occupies about one quarter of the space of the main body part 23, and wiring of an electrical system and sensors such as a thermometer are placed in the machine housing unit 5. As illustrated in FIG. 3A, the machine housing unit 5 is formed by an upper structure part of the shape obtained by making part of the main body part 23 deeper to near the bottom part 22, and is closed by placing a cover member 2d in an upper part thereof. Specifically, the machine housing unit 5 is divided from the propellant holding unit 3 by the partition wall 21, and is divided from the gas storing unit 4 by the partition, wall 21' (cover member 2c). The cover member 2d may be fixed to the main body part 23 by a fastening tool such as a bolt, and may be fixed to the main body part 23 by connection means such as welding and an adhesive.

Moreover, as illustrated in FIG. 2A and FIG. 3A, the gas supply tube 51 that connects the gas outlet 42 and the gas flow path 7 to each other may be arranged in the machine housing unit 5, and a valve 52 that controls ejection of the gas may be provided to the gas supply tube 51. The gas supply tube 51 is a pipe that supplies the gas stored in the gas storing unit 4 to the gas flow path 7. Moreover, the valve 52 is a so-called latching valve. The valve 52 is always in an opened state in the state where there is a possibility that the vapor letting device 1 is used in outer space or the like. The valve 52 is switched to a closed state in the cases where any abnormality occurs in the vapor jetting device 1, where the propellant is used up, where the vapor jetting device 1 ends its service, and where the vapor jetting device 1 does not reach outer space or comes out of outer space.

Moreover, examples of the machines placed in the machine housing unit 5 include: an electric connector 53 connected to a power source mounted on a spacecraft or the like; a pressure sensor 54 that measures the pressure of the propellant holding unit 3; a temperature sensor 55 that measures the temperature of the gas storing unit 4; and a thermostat 56 that controls the heater 8. In the vapor jetting device 1 according to the present embodiment, the saturated steam pressure is controlled by the heater 8, whereby a pressure regulating valve having a complicated mechanism can be omitted. For example, the thermostat 56 is set to a temperature at which the steam pressure necessary as the thruster can be maintained, and the pressure of the propellant holding unit 3 and the temperature of the gas storing unit 4 are respectively monitored by the pressure sensor 54 and the temperature sensor 55, whereby on/off and output of the heater 8 are controlled. Only any one of the pressure sensor 54 and the temperature sensor 55 may be placed. In the case where the temperature and the pressure do not need to be monitored, the pressure sensor 54 and the temperature sensor 55 may be omitted. The thermostat 56 is given as an example control apparatus for the heater 8, and may be changed to a microcontroller and the like. Moreover, the machines placed in the machine housing unit 5 are hot limited to those described above, and can be arbitrarily selected as needed. For example, a battery for supplying electric power to a propellant valve that is attached to each nozzle 6 in order to open and close the nozzle 6 may be placed in the machine housing unit 5. Note that, for ease of description, illustration of the temperature sensor 55, the thermostat 56, the wiring, and the like are omitted in FIG. 3A.

Moreover, because the machine housing unit 5 forms a space isolated from the propellant holding unit 3 and the gas storing unit 4, an opening part 57 for inserting wiring connected to the nozzles 6 and the heater 8 placed outside of the main body part 23 may be formed in the machine housing unit 5. Note that a seal material for hermetically closing the opening part 57 may be placed depending on the types of components placed in the machine housing unit 5.

The nozzles 6 are components that eject the vaporized gas of the propellant to the outside of the vapor jetting device 1, and opening/closing thereof can be controlled by, for example, a built-in solenoid valve. As illustrated in FIG. 1A and FIG. 1B, the nozzles 6 are respectively placed at the four corners of the casing 2, but the present invention is not limited to such placement. For example, the nozzles 6 may be placed at only part of the four corners of the casing 2, and may be placed along edge parts of the casing 2. Moreover, although the case where the nozzles 6 are connected perpendicularly to the bottom part 22 of the casing 2 is illustrated here, the nozzles 6 may be connected obliquely to the bottom part 22. Further, although not illustrated, the nozzles 6 may be connected to the casing 2 through a pipe communicated with the gas flow path 7, and the nozzles 6 may be placed at a position separated from the casing 2.

The gas flow path 7 is a manifold formed in the easing 2. The gas flow path 7 has one end connected to the gas supply tube 51 and other ends respectively connected to the nozzles 6. Because the gas flow path 7 is formed in the casing 2 in this manner, the number of pipes for supplying the gas to the nozzles 6 can be reduced, and labor in the piping connection work and the leakage inspection work can be reduced.

Figure 4A:
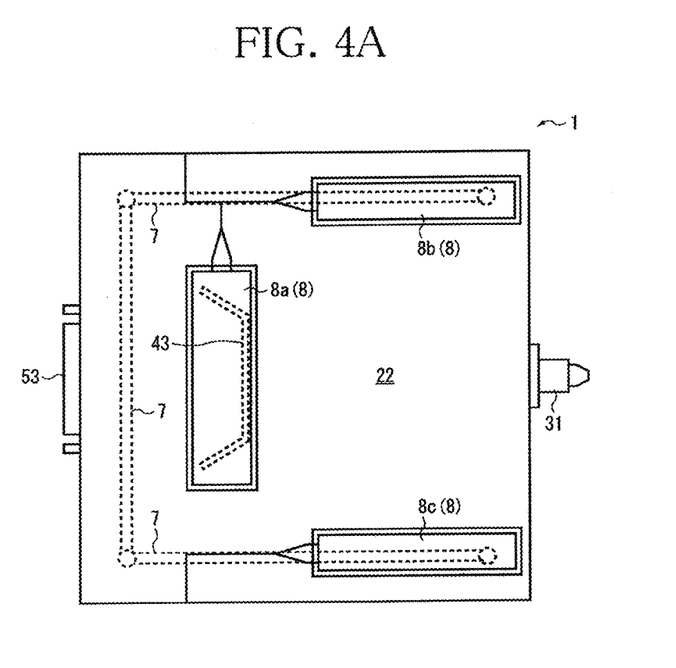
FIG. 4A is a bottom view of the vapor jetting device.
Figure 4B:
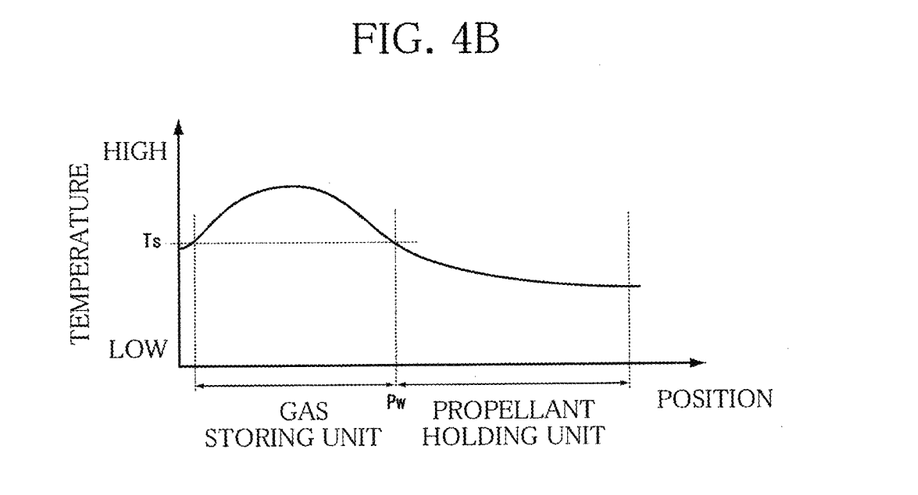
FIG. 4B is a temperature gradient graph of a casing.

The heater 8 is a component that gives thermal energy to the propellant and promotes evaporation of the propellant. Here, FIG. 4A and FIG. 4B are diagrams illustrating the detail of the vapor jetting device, FIG. 4A is a bottom view thereof, and FIG. 4B is a temperature gradient graph of the casing. As illustrated in FIG. 4A, a plurality of heaters 8a, 8b, 8c are placed on the lower surface of the bottom part 22 of the casing 2. For example, the heater 8a is placed at a position corresponding to the heat spreader 43, and the heaters 8b, 8c are respectively placed at positions along end parts of the gas flow path 7. The heater 8a has a function of: heating the gas storing unit 4 such that the gas in the gas storing unit 4 is kept in a predetermined steam pressure; and heating the heat spreader 43 such that the propellant in the form of liquid does not enter. Moreover, the heaters 8b, 8c each have a function of heating the gas flow path 7 such that the gas supplied to each nozzle 6 does not liquefy. Note that the propellant in the propellant holding unit 3 is warmed and gradually gasified by thermal conduction of the casing 2 due to the heating by the heater 8, and is supplied to the gas storing unit 4.

Moreover, as illustrated in FIG. 4B, the beater 8 (heaters 8a, 8b, 8c) is controlled such that the temperature of the gas storing unit 4 becomes higher than the temperature of the propellant holding unit 3. In FIG. 4B, the vertical axis represents temperature (° C.), the horizontal axis represents the position of the casing 2, Pw represents the position of the partition wall 21, and Ts represents the boiling point of the propellant. The heater 8 (heaters 8a, 8b, 8c) is controlled in the following manner: the propellant reaches its boiling point Ts and evaporates at the position. Pw of the partition wall 21; the temperature of the gas storing unit 4 becomes higher than the boiling point Ts; and the temperature of the propellant holding unit 3 becomes lower than the boiling point Ts. The temperature gradient is provided in this manner, whereby the propellant in the form of liquid can be effectively suppressed from entering the gas storing unit 4.

Figure 5:
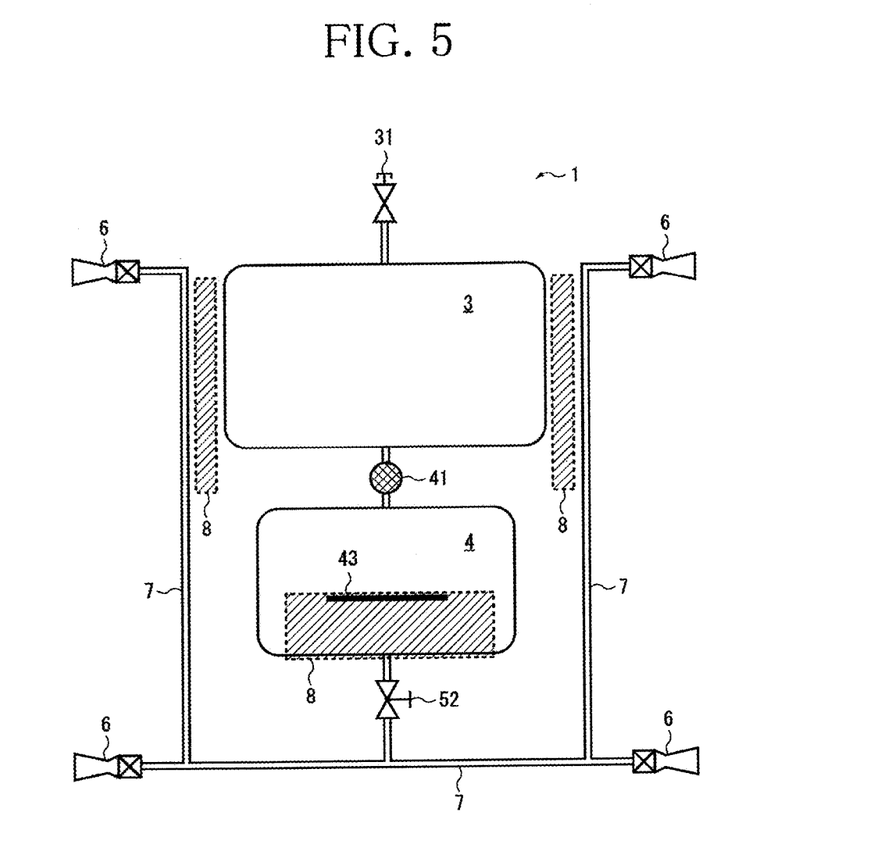
FIG. 5 is a system configuration view of the vapor jetting device.

Next, a system configuration view of the vapor jetting device 1 is described. FIG. 5 is the system configuration view of the vapor jetting device illustrated in FIG. 1. As illustrated in FIG. 5, the vapor jetting device 1 includes, from its upstream side: the propellant holding unit 3 that holds the propellant in the form of liquid; the gas storing unit 4 that stores the gas of the vaporized propellant; and the nozzles 6 that eject the gas to the outside to thereby obtain thrust, and the gas storing unit 4 and the nozzles 6 are connected to each other by the gas flow path 7. Moreover, the fill and drain port 31 is placed in the propellant holding unit 3, the filter 41 is placed between the propellant holding unit 3 and the gas storing unit 4, the heat spreader 43 is placed in the gas storing unit 4, and the valve 52 is placed downstream of the gas storing unit 4. Moreover, the heater 8 that heats the gas storing unit 4, the heat spreader 43, and the gas flow path 7 is placed.

Then, in the vapor jetting device 1 according to the present embodiment, all the components illustrated in the above-mentioned system configuration view are collectively placed in one casing 2. Accordingly, the components that have been individually placed in conventional cases can be unitized, and reduction in size and simplification of the apparatus can be achieved.

Next, how to use the above-mentioned vapor jetting device 1 is described. Here, FIG. 6A to FIG. 6F are diagrams each illustrating a use state of the vapor jetting device illustrated, in FIG. 1, FIG. 6A illustrates a first example, FIG. 6B illustrates a second example, FIG. 6C illustrates a third example, FIG. 6D illustrates a fourth example, FIG. 6E illustrates a fifth example, and FIG. 6F illustrates a sixth example.

Figure 6A:
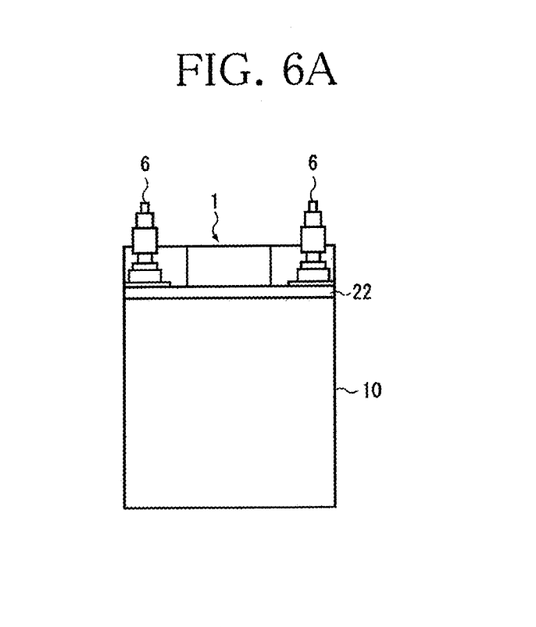
FIG. 6A is a diagram illustrating a first example of a use state of the vapor jetting device.

In the first example of the use state illustrated in FIG. 6A, one vapor jetting device 1 is placed on one surface of a spacecraft 10 such as a small satellite. The spacecraft 10 has, for example, a cubic or rectangular parallelepiped shape that is about ten centimeters to about several meters on a side, and the bottom part 22 of the vapor jetting device 1 is connected to the one surface of the spacecraft 10.

Figure 6B:
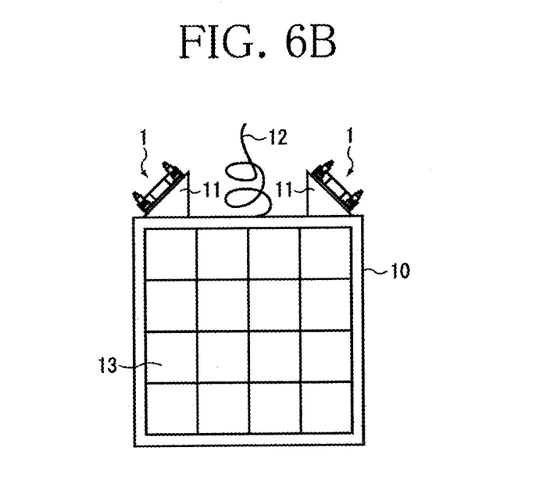
FIG. 6B is a diagram illustrating a second example of the use state of the vapor jetting device.
Figure 6C:
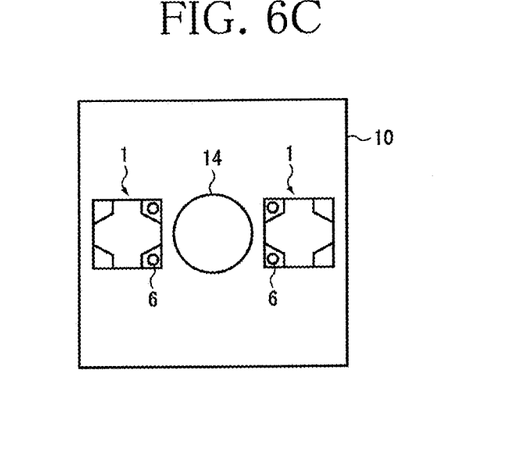
FIG. 6C is a diagram illustrating a third example of the use state of the vapor jetting device.
Figure 6D:
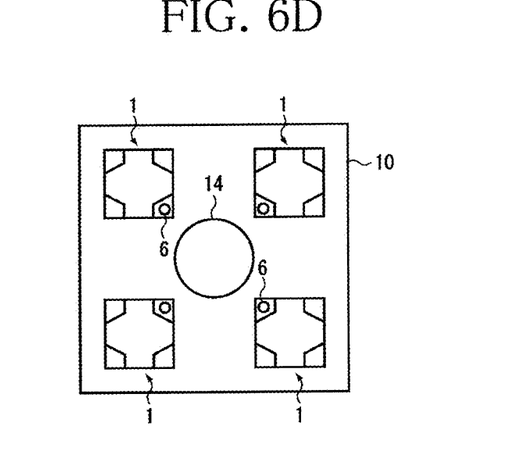
FIG. 6D is a diagram illustrating a fourth example of the use state of the vapor jetting device.
Figure 6E:
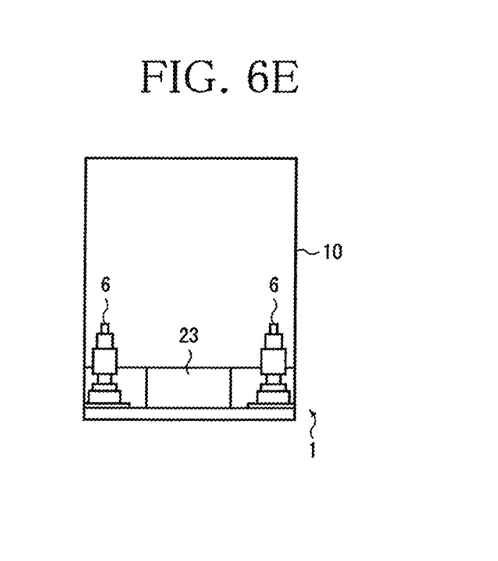
FIG. 6E is a diagram illustrating a fifth example of the use state of the vapor jetting device.
Figure 6F:
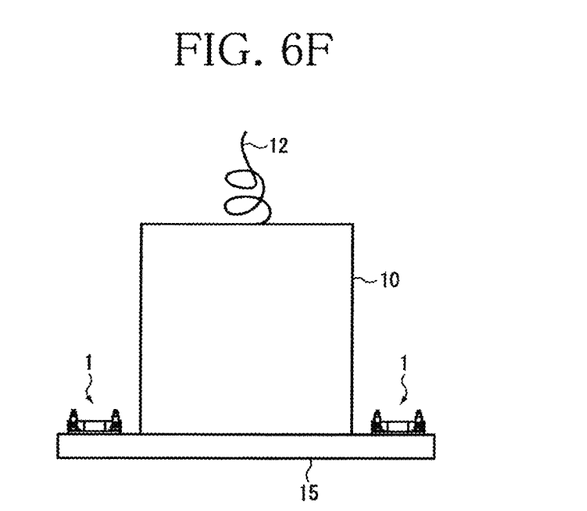
FIG. 6F is a diagram, illustrating a sixth example of the use state of the vapor jetting device.

In the second example of the use state illustrated in FIG. 6B, a pair of the vapor jetting device 1 is placed on one surface of the spacecraft 10 such as the small satellite. The spacecraft 10 has, for example, a cubic or rectangular parallelepiped shape that is several tens of centimeters or more on a side, and the vapor jetting devices 1 are respectively connected to pedestals 11 formed on the one surface of the spacecraft 10. The pedestals 11 are inclined, for example, such that the vapor jetting devices 1 face outward. Note that, instead of forming the pedestals 11, the steam may be jetted toward a desired direction, by adjusting the installation angles of the nozzles 6 placed in the vapor jetting devices 1.

Moreover, the spacecraft 10 may be a space debris removing apparatus that captures and decelerates space debris that is making irregular movements, to thereby remove the space debris from its orbit. The space debris removing apparatus includes, for example: a propulsion apparatus for approaching the space debris; a connection apparatus for connecting to the space debris; a deceleration apparatus for spreading an electrically conductive tether 12 in outer space and decelerating the space debris; and a solar panel 13 placed on its outer surface. With the use of the electrically conductive tether 12, the space debris removing apparatus generates a force of pulling the electrically conductive tether 12 toward the Earth to thereby decelerate the space debris, and this operation is based on the principle that the Lorentz force acts on the electrically conductive tether 12 from a relation between a current and a magnetic field applied to the electrically conductive tether 12. Note that the method of mounting the solar panel 13 illustrated in FIG. 6B is given as a mere example, the present invention is not limited to such a configuration, and, for example, the solar panel 13 may be mounted as a solar array wing on the spacecraft 10.

In the third example of the use state illustrated in FIG. 6C, a pair of the vapor letting devices 1 is placed on one surface of the spacecraft 10 such as the space debris removing apparatus so as to confront each other. In each vapor jetting device 1, for example, the nozzles 6 are placed at only inner two of the four corners of the casing 2. For example, in the case where the spacecraft 10 is the space debris removing apparatus, the vapor jetting devices 1 are placed so as to sandwich an opening part 14 from which the electrically conductive tether 12 is ejected. Note that the placement of the nozzles 6 in each vapor jetting device 1 may be arbitrarily determined. For example, the nozzle 6 may be placed at only one of the four corners of the casing 2, and the nozzles 6 may be placed at only two thereof, and may be placed at three thereof or all the four corners.

In the fourth example of the use state illustrated in FIG. 6D, four vapor jetting devices 1 are diagonally placed on one surface of the spacecraft 10 such as the space debris removing apparatus. In each vapor letting device 1, for example, the nozzle 6 is placed at only one corner closest to the opening part 14, of the four corners of the casing 2. Note that the placement and the number of the nozzles 6 in each vapor jetting device 1 may be arbitrarily determined. For example, the nozzle 6 may be placed at only one corner farthest from the opening part 14, and the nozzles 6 may be placed at three corners excluding the farthest one, of the four corners of the casing 2, and may be placed at all the four corners.

In the fifth example of the use state illustrated in FIG. 6E, the spacecraft 10 such as the small satellite is placed on the main body part 23 of the vapor jetting device 1. The use state of the fifth example can be applied in the case where the outer shape of the spacecraft 10 has a size that is the same as or smaller than that of the main body part 23 of the vapor jetting device 1 or where the cuter shape of the spacecraft 10 does not interfere with the nozzles 6.

In the sixth example of the use state illustrated in FIG. 6F, an expansion part 15 that is laterally expanded is formed on one surface of the spacecraft 10 such as the small satellite, and a plurality of the vapor jetting devices 1 are placed on the expansion part 15. The expansion part 15 may be a circular or polygonal flange member formed by expanding the entire outer periphery, and may be a boom member formed by expanding only a portion necessary to support the vapor jetting devices 1.

Figure 7A:
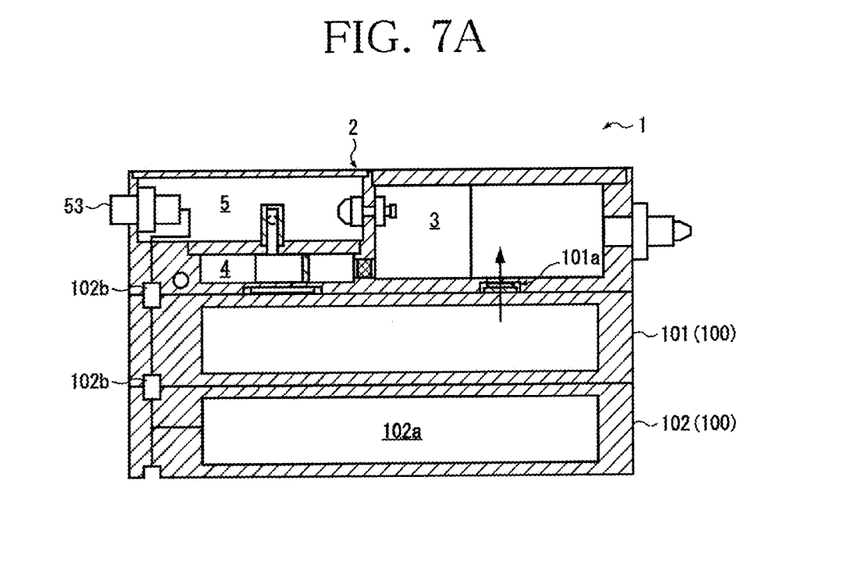
FIG. 7A is a vertical sectional view illustrating a vapor letting device according to a second embodiment of the present invention.
Figure 7B:
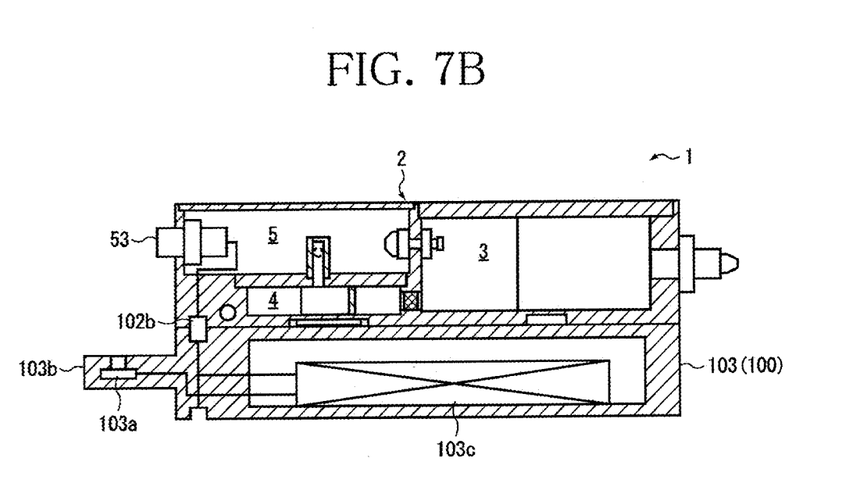
FIG. 7B is a vertical sectional view illustrating a vapor jetting device according to a third embodiment of the present invention.

Next, vapor jetting devices 1 according to other embodiments of the present invention are described with reference to FIG. 1A and FIG. 7B. Here, FIG. 7A and FIG. 7B are vertical sectional views respectively illustrating the vapor jetting devices according to other embodiments of the present invention, FIG. 7A illustrates a second embodiment, and FIG. 7B illustrates a third embodiment. Note that the same components as those in the vapor letting device 1 according to the first embodiment illustrated in FIG. 1A to FIG. 5 are denoted by the same reference signs, and redundant description thereof is omitted.

In the embodiments respectively illustrated FIG. 7A and FIG. 7B, the casing 2 is stackable on an additional module 100 having the same shape. In the vapor jetting device 1 according to the second embodiment illustrated in FIG. 7A, an additional tank 101 that stores a propellant and a battery module 102 on which a battery 102a is mounted are stacked as the additional module 100. Moreover, in the vapor jetting device 1 according to the third embodiment illustrated in FIG. 7B, a monitoring module 103 on which a camera 103a is mounted is stacked as the additional module 100.

The additional tank 101 illustrated in FIG. 7A may have, for example, the same height (thickness) as that of the casing 2, and may have a height (thickness) suited to a necessary volume of the propellant. In the case where the additional tank 101 is stacked in this manner, a fluid connector 101a that allows the propellant holding unit 3 and the additional tank 101 to communicate with each other is placed in the bottom part of the casing 2 and the top part of the additional tank 101.

The battery module 102 illustrated in FIG. 7A may have, for example, the same height (thickness) as that of the casing 2, and may have a height (thickness) suited to a necessary volume of the battery 102a. In the case where the battery module 102 is stacked in this manner, an electric connector 102b that can electrically connect the bottom part of the casing 2 and the top part of the battery module 102 to each other is placed. Moreover, in the case where another additional module 100 (for example, the additional tank 101) is interposed between the casing 2 and the battery module 102, an electric connector 102b that forms a relay point is also placed in the additional module 100 interposed between the casing 2 and the battery module 102.

In the monitoring module 103 illustrated in FIG. 7B, the camera 103a such as a CCD camera is buried in a flange part 103b extended outward, and a control unit 103c is placed in the module. The monitoring module 103 can obtain information for controlling opening/closing of each nozzle 6 from images taken by the camera 103a, and can control opening/closing of each nozzle 6 at the same time as obtaining such information. The camera 103a, which is given as a mere example monitoring machine, may be a machine capable of acquiring still image information, and may be a machine capable of acquiring moving image information. Moreover, measuring machines, such as a laser radar capable of recognizing a relative position relation to a target and a gyroscope capable of detecting its own posture, may be mounted on the monitoring module 103 instead of or together with the camera 103a.

In the present embodiments, because the propellant holding unit 3, the gas storing unit 4, and the machine housing unit 5 are placed in one casing 2, the casing 2 is stackable on the additional module 100 having the same shape, and the additional module 100 such as the additional tank 101, the battery module 102, and the monitoring module 103 can be easily stacked. Accordingly, performance improvement and function addition of the vapor jetting device 1 can be easily achieved, and the convenience thereof can be improved.

Note that the additional module 100 is not limited to the additional tank 101, the battery module 102, and the monitoring module 103 described above, and an arbitrary module can be stacked as the additional module 100 by configuring the arbitrary module in the same box-like shape as that of the casing 2 in accordance with a function desired to be added (examples of the arbitrary module include: a control module including a built-in valve driving circuit of the vapor jetting device 1 and a built-in control circuit for machines mounted on the vapor jetting device 1 and the additional module 100; and a posture controlling module including a gyroscope).

The present invention is not limited to the embodiments described above, and it goes without saying that the present invention can be variously changed within a range not departing from the gist of the present invention. For example, the propellant holding unit 3, the gas storing unit 4, and the machine housing unit 5 may be placed in a three-layer structure formed in the top-bottom direction or the left-right direction.

EXPLANATION OF REFERENCE SIGNS 1 vapor jetting device
2 casing
2a communication hole
3 propellant holding unit
4 gas storing unit
5 machine housing unit
6 nozzle
7 gas flow path
8, 8a, 8b, 8c heater
21, 21' partition wall
31 fill and drain port
32 propellant holding plate
41 filter
42 gas outlet
43 heat spreader
51 gas supply tube
52 valve
100 additional module
101 additional tank
102 battery module
103 monitoring module

The invention claimed is:

1. A spacecraft comprising:
a vapor jetting device that evaporates a propellant in the form of liquid to generate vapor and jets gas by means of a vapor pressure of the vapor to thereby obtain thrust to propel the spacecraft, the vapor jetting device comprising:
a cuboid-shaped casing;
a propellant holding unit that is placed in the cuboid-shaped casing and forms a first space for holding the propellant;
a gas storing unit that is placed in the cuboid-shaped casing, forms a second space that is divided from the propellant holding unit by a partition wall including a communication hole that provides fluid communication between the propellant holding unit and the gas storage unit, and stores the gas;
a machine housing unit that is placed in the cuboid-shaped casing, forms a third space that is divided from the propellant holding unit and the gas storing unit by partition walls, and houses machines;
a nozzle that is connected to the cuboid-shaped casing and ejects the gas to an outside;
a gas flow path that is formed in the cuboid-shaped casing and supplies the gas stored in the gas storing unit to the nozzle; and
a heater that is placed in the cuboid-shaped casing and heats at least the gas storing unit wherein the propellant holding unit comprises:
a fill and drain port for pouring or discharging the propellant, wherein the propellant holding unit is between the fill and drain port and the gas storing unit; and
a plurality of propellant holding plates that are placed about the fill and drain port and generate surface tension on the propellant to thereby hold the propellant, wherein the fill and drain port is configured to discharge the propellant between the plurality of propellant holding plates.

2. The spacecraft according to claim 1, wherein the gas storing unit includes: a gas outlet for discharging the gas; and a heat spreader placed between the gas outlet and the communication hole.

3. The spacecraft according to claim 2, wherein a gas supply tube, that connects the gas outlet to the gas flow path, is arranged in the machine housing unit, and
a valve that controls ejection of the gas is provided to the gas supply tube.

4. The spacecraft according to claim 2, wherein the heater is placed at a position adjacent to the heat spreader.

5. The spacecraft according to claim 1, wherein a filter that suppresses the propellant in the form of liquid from entering the gas storing unit is placed in the communication hole.

6. The spacecraft according to claim 1, wherein the heater is controlled such that a temperature of the gas storing unit becomes higher than a temperature of the propellant holding unit.

7. The spacecraft according to claim 1, wherein the cuboid-shaped casing is stackable on an additional module having the same shape.

8. The spacecraft according to claim 7, wherein the additional module is at least one of: an additional tank that stores the propellant; a battery module on which a battery is mounted; a monitoring module on which a monitoring machine or a measuring machine is mounted; and a control module that controls machines mounted on the vapor jetting device or the additional module.

* * * * *

UNITED STATES PATENT AND TRADEMARK OFFICE
CERTIFICATE OF CORRECTION

PATENT NO. : 9,989,012 B2
APPLICATION NO. : 14/617341
DATED : June 5, 2018
INVENTOR(S) : Taku Izumiyama et al.

It is certified that error appears in the above-identified patent and that said Letters Patent is hereby corrected as shown below:

On the Title Page

Item [73], insert thereafter --IHI CORPORATION, Tokyo (JP) and IHI AEROSPACE CO., LTD., Tokyo (JP)--.

Signed and Sealed this
Thirtieth Day of April, 2019

Andrei Iancu
*Director of the United States Patent and Trademark Office*